(12) United States Patent
Borde et al.

(10) Patent No.: US 11,472,217 B2
(45) Date of Patent: Oct. 18, 2022

(54) SECURITY ELEMENT FOR A VALUABLE DOCUMENT, METHOD FOR PRODUCING SAME AND VALUABLE DOCUMENT THAT COMPRISES IT

(71) Applicant: OBERTHUR FIDUCIAIRE SAS, Paris (FR)

(72) Inventors: Xavier Borde, Osse (FR); Julien Gillot, Chateaugiron (FR); Guillaume Chapeau, Erce Pres Liffre (FR)

(73) Assignee: OBERTHUR FIDUCIARES SAS

( * ) Notice: Subject to any disclaimer, the term of this patent is extended or adjusted under 35 U.S.C. 154(b) by 0 days.

(21) Appl. No.: 17/285,652

(22) PCT Filed: Oct. 22, 2019

(86) PCT No.: PCT/EP2019/078765
§ 371 (c)(1),
(2) Date: Apr. 15, 2021

(87) PCT Pub. No.: WO2020/083938
PCT Pub. Date: Apr. 30, 2020

(65) Prior Publication Data
US 2021/0394547 A1   Dec. 23, 2021

(30) Foreign Application Priority Data

Oct. 22, 2018   (FR) ..................................... 1859737

(51) Int. Cl.
*B42D 25/324* (2014.01)
*B42D 25/425* (2014.01)
*B42D 25/328* (2014.01)
*G02B 5/18* (2006.01)

(52) U.S. Cl.
CPC ......... *B42D 25/324* (2014.10); *B42D 25/328* (2014.10); *B42D 25/425* (2014.10); *G02B 5/1861* (2013.01)

(58) Field of Classification Search
CPC ........................... B42D 25/324; B42D 25/425
See application file for complete search history.

(56) References Cited

FOREIGN PATENT DOCUMENTS

| AU | 2010219575 A1 | 2/2012 | |
|---|---|---|---|
| FR | 2942811 A1 * | 9/2010 | ............ B42D 25/29 |
| FR | 2942811 A1 | 9/2010 | |

OTHER PUBLICATIONS

FR-2942811-A1 English Translation (Year: 2010).*

(Continued)

*Primary Examiner* — Kyle R Grabowski
(74) *Attorney, Agent, or Firm* — Lerner, David, Littenberg, Krumholz & Mentlik, LLP

(57) ABSTRACT

The present invention relates in particular to a security element (1) for a valuable document, which comprises an array (R) of at least two contiguous or adjacent lines (2, 2', 2"), at least one of these lines (2) being raised and having two opposing and at least partially inclined sides (20, 21) that each originate along one of the longitudinal and opposing edges (200, 210) of the line (2), characterised by the fact that the two opposing inclined flanks (20, 21) meet at a single, uninterrupted, sinuous junction area (22), that extends in the longitudinal direction of the line (2), the sides (20, 21) having no discontinuities or interruptions at least in the longitudinal direction.

20 Claims, 19 Drawing Sheets

(56) References Cited

OTHER PUBLICATIONS

French Search Report for Application No. 1859737 dated Apr. 5, 2019 pp. 1-2.
International Search Report for Application No. PCT/EP2019/078765 dated Jan. 17, 2020, pp. 1-2.

* cited by examiner

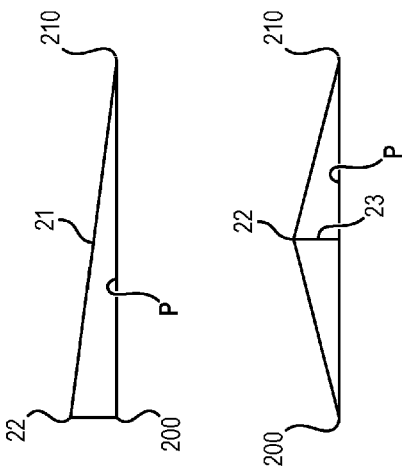
FIG. 4A
FIG. 4B
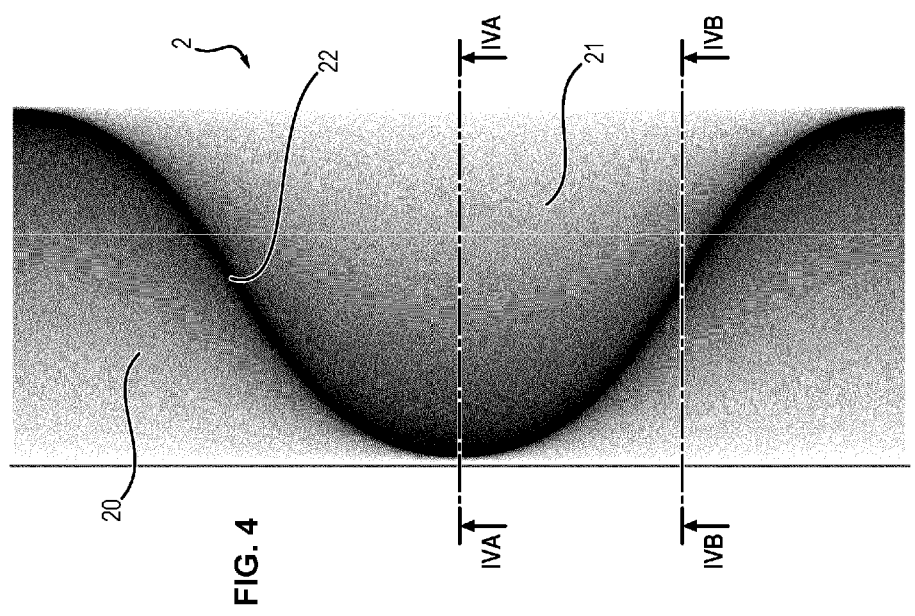
FIG. 4

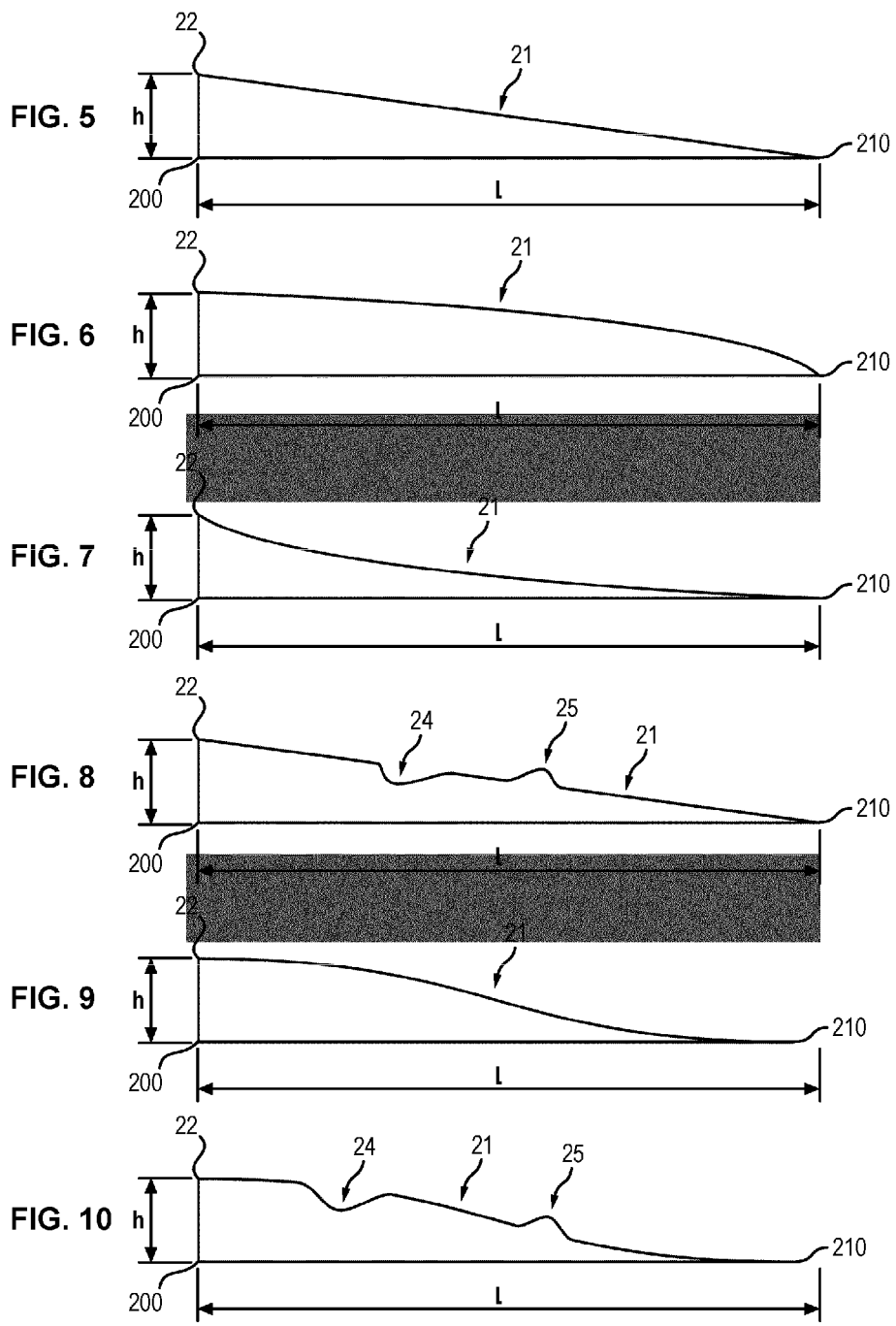

FIG. 16
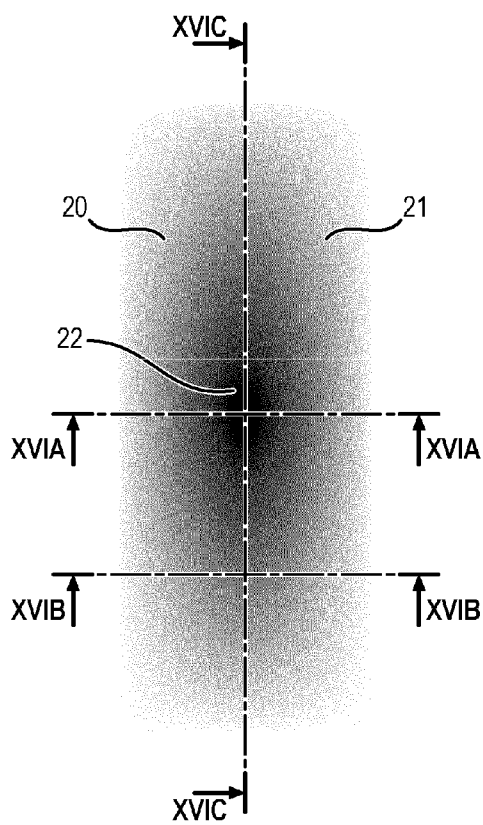
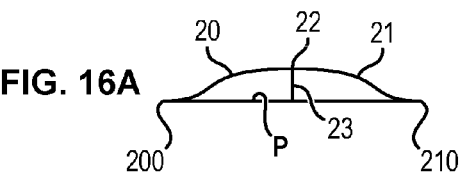
FIG. 16A
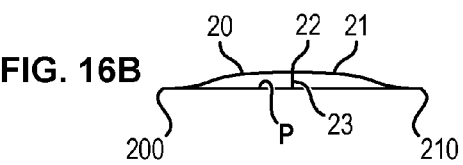
FIG. 16B
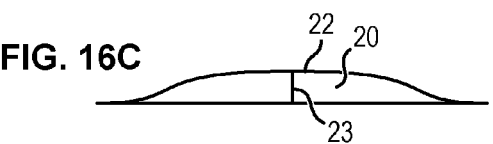
FIG. 16C

FIG. 17
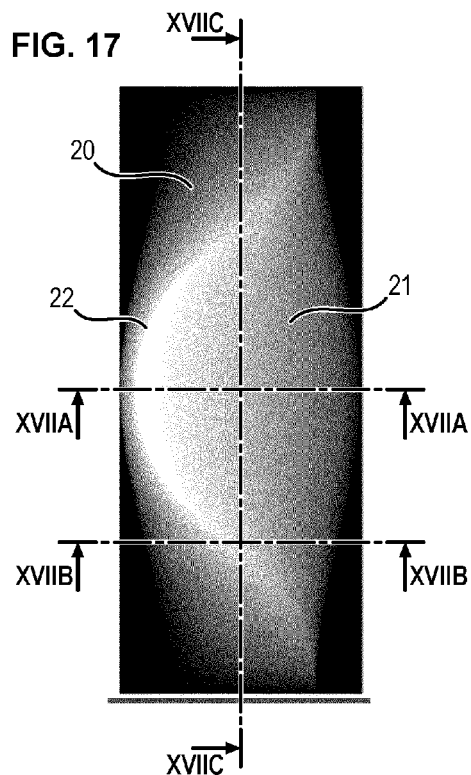
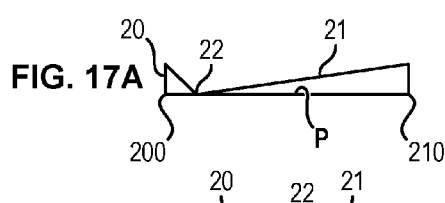
FIG. 17A
FIG. 17B
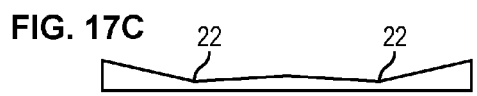
FIG. 17C
FIG. 18
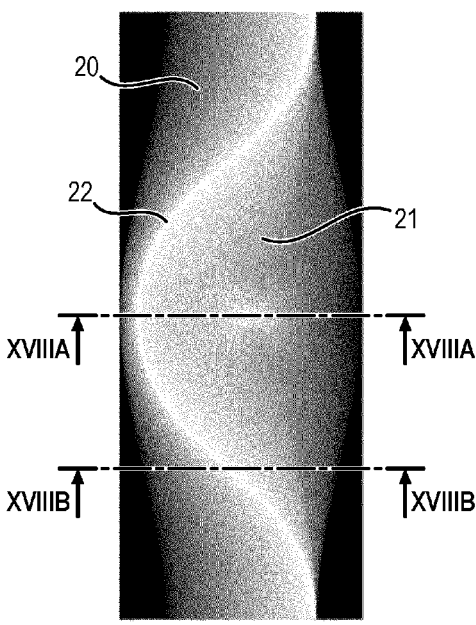
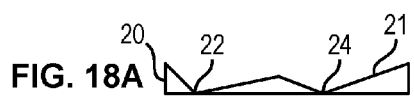
FIG. 18A
FIG. 18B

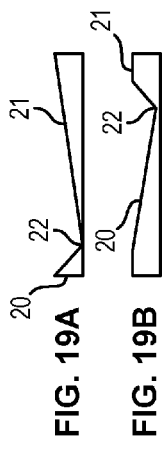
FIG. 19A
FIG. 19B
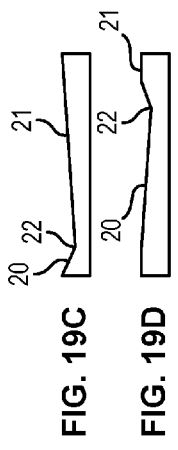
FIG. 19C
FIG. 19D
FIG. 19E
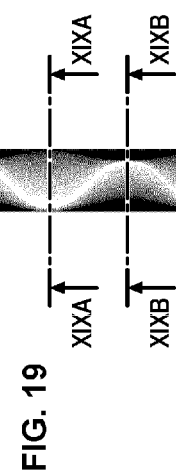
FIG. 19

FIG. 21
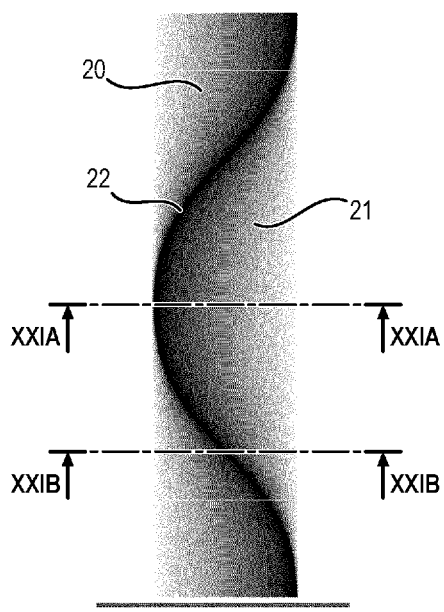
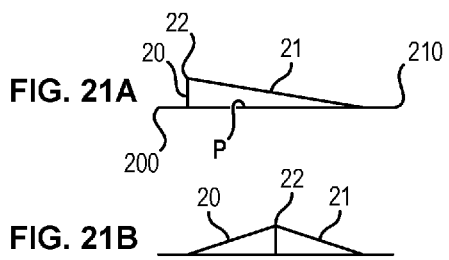
FIG. 21A
FIG. 21B
FIG. 22
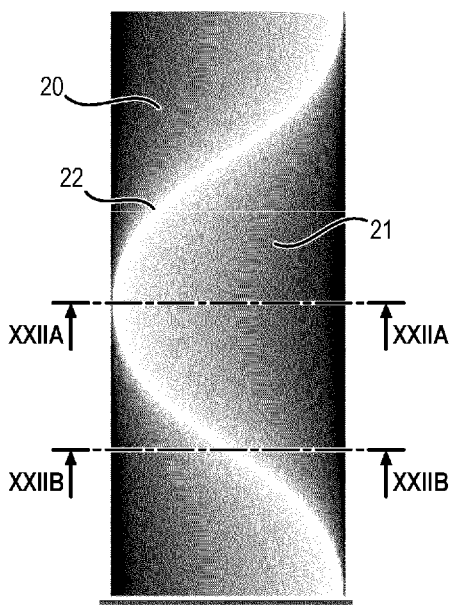
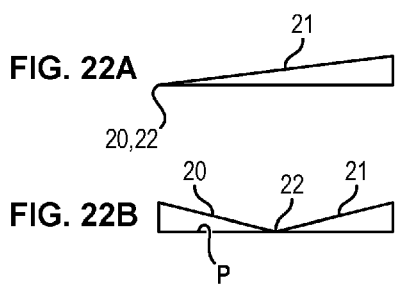
FIG. 22A
FIG. 22B

FIG. 23
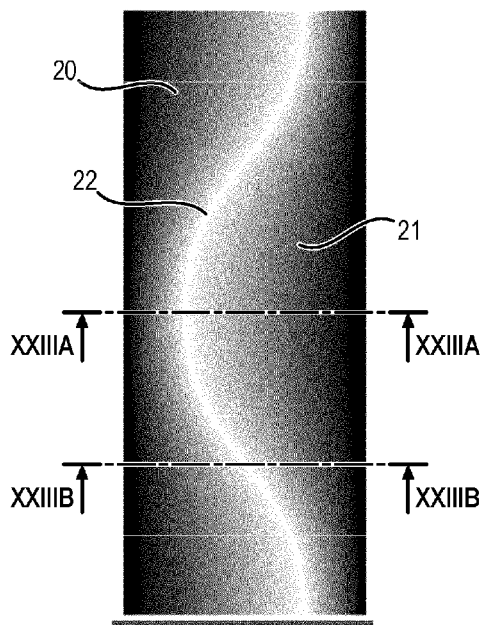
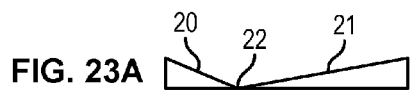
FIG. 23A
FIG. 23B
FIG. 24
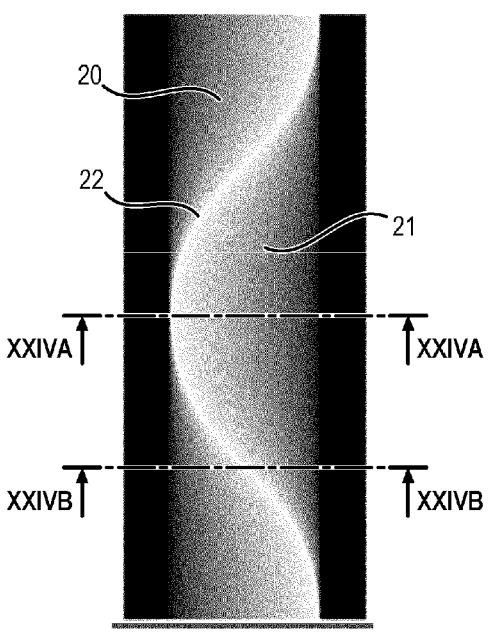
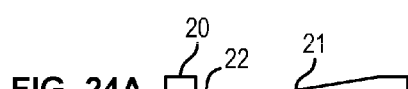
FIG. 24A
FIG. 24B FIG. 25
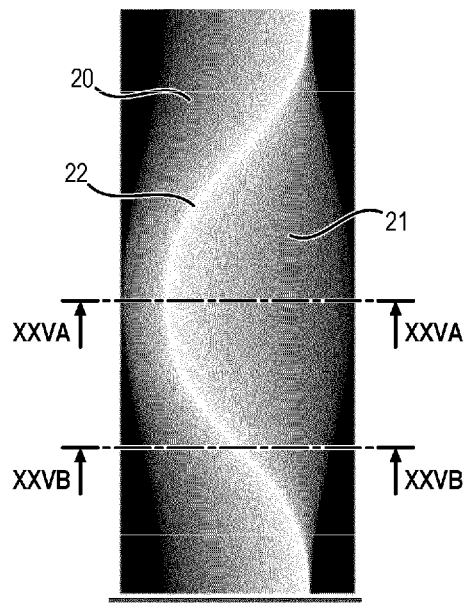
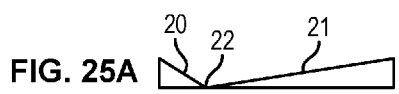
FIG. 25A
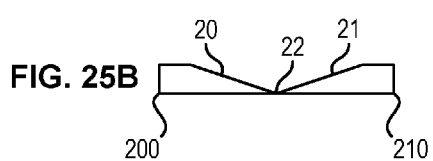
FIG. 25B
FIG. 26
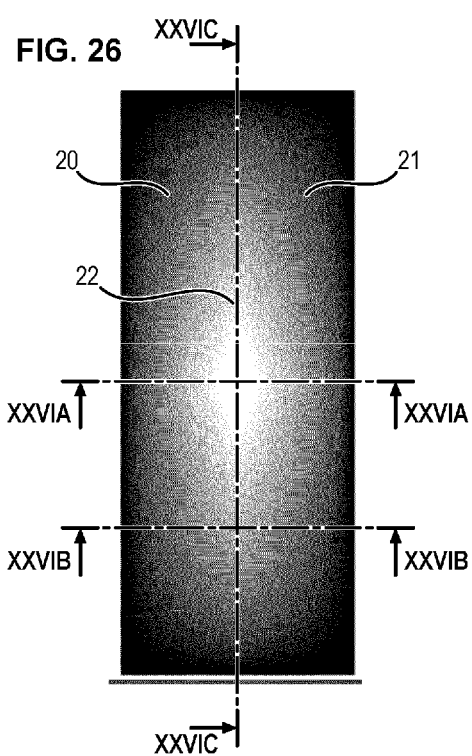
FIG. 26A
FIG. 26B
FIG. 26C

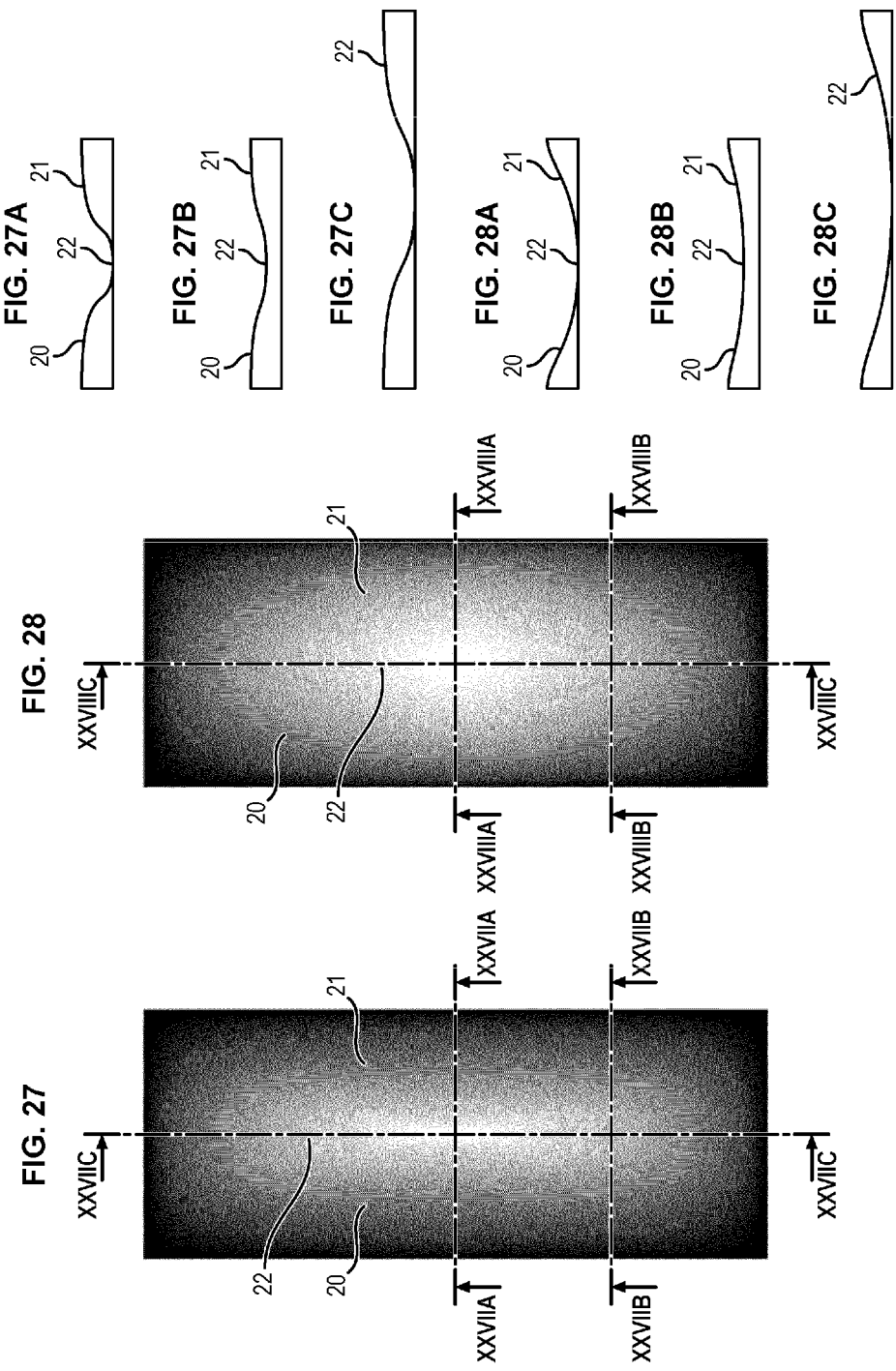

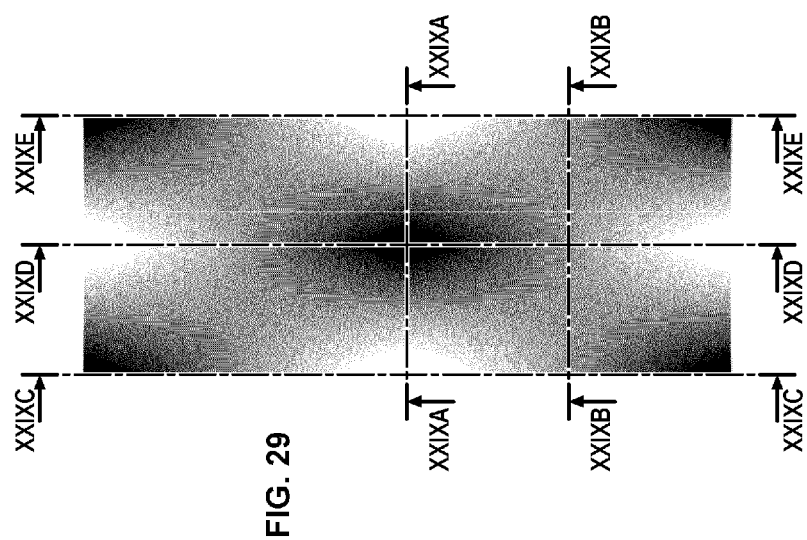
FIG. 29
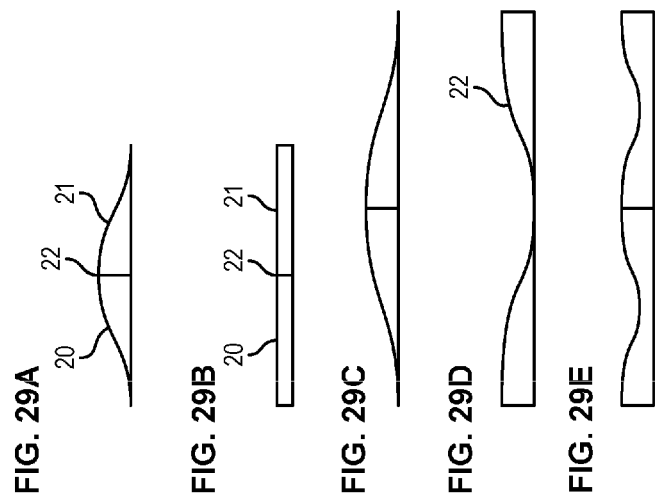
FIG. 29A
FIG. 29B
FIG. 29C
FIG. 29D
FIG. 29E

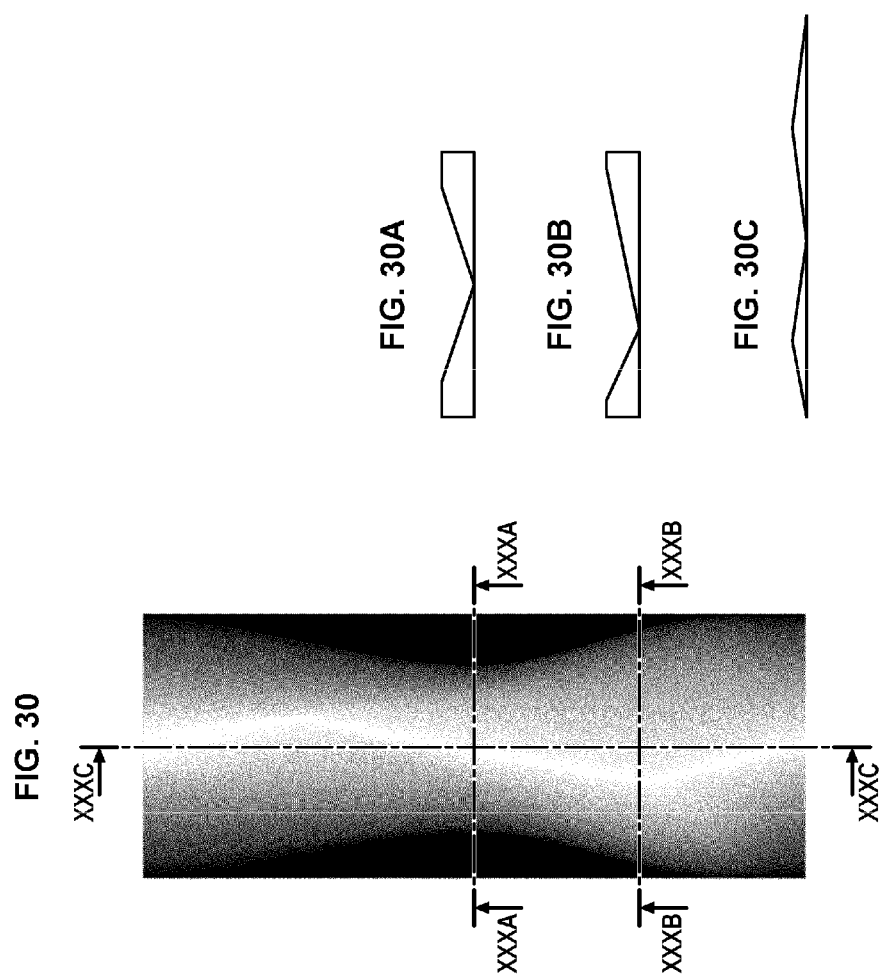

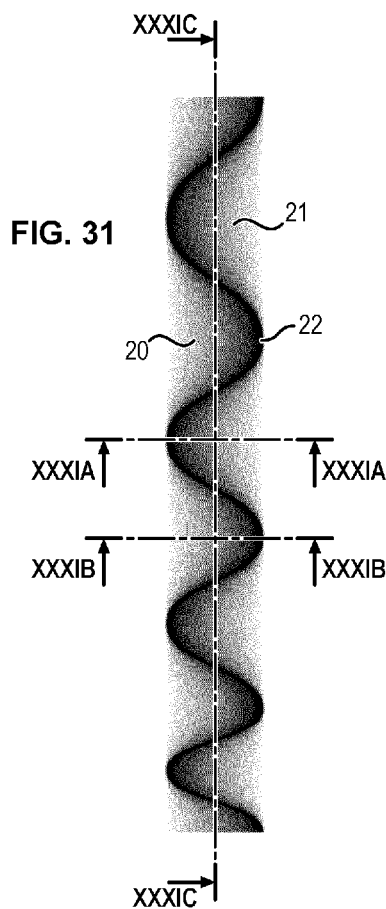
FIG. 31
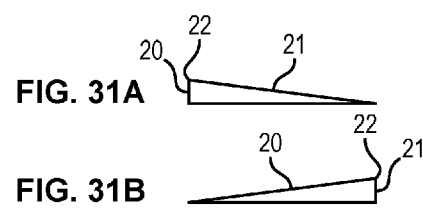
FIG. 31A
FIG. 31B
FIG. 31C
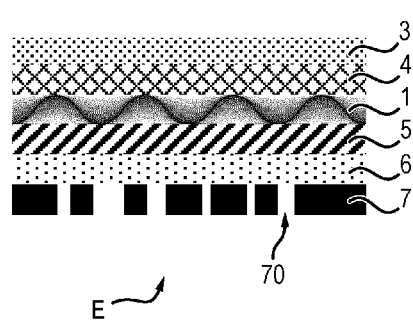
FIG. 32
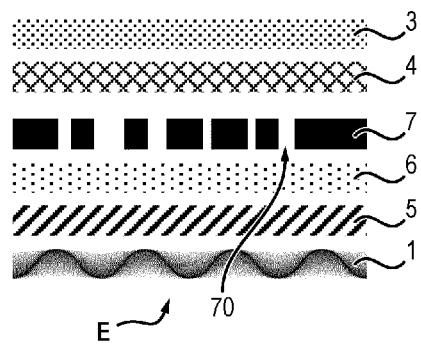
FIG. 33

SECURITY ELEMENT FOR A VALUABLE DOCUMENT, METHOD FOR PRODUCING SAME AND VALUABLE DOCUMENT THAT COMPRISES IT

CROSS-REFERENCE TO RELATED APPLICATIONS

The present application is a national phase entry under 35 U.S.C. § 371 of International Application No. PCT/EP2019/078765, filed Oct. 22, 2019, published in French, which claims priority from French Patent Application No. 1859737 filed Oct. 22, 2018, all of which are incorporated herein by reference.

FIELD OF THE INVENTION

The present invention relates to a security element for a valuable document. It also concerns a manufacturing method such a security element as well as a valuable document which includes at least such a security element.

TECHNOLOGICAL BACKGROUND OF THE INVENTION

Securities called first-level securities, i.e. those that are visible without additional equipment, are effective bulwarks against counterfeit security documents or valuable documents such as banknotes.

Also, the manufacturers of this type of documents concentrate on the achievements of these securities by making sure that they remain very intuitive in their operation but complex to achieve without the know-how and the appropriate equipment and, of course, impossible to counterfeit. This implies that the technologies used for their achievement are difficult to access for the general public and that the implementation of these tools is restricted and/or dedicated to the specific trades in securing documents.

Indeed, these are elements that can be easily authenticated by everyone and that allow everyone to authenticate a document such as a banknote.

Document FR-A-2942811 discloses a technique of formation of a security element comprising an array of relief lines, each including at least one flank whose angle of inclination varies gradually along this line so as to form in light reflection a degraded optical effect which changes according to the viewing angle of this element.

This document teaches in particular the production of a plate for intaglio printing made by means of a laser engraving or a precision mechanical milling tool including in negative the array of lines mentioned above.

This plate is used as a means for embossing a paper-type medium including a reflective surface, for example of the iridescent ink or color-changing ink type. In an alternative mode, it is also possible to cover (coat) a previously embossed surface with ink.

More particularly, the width of a line of the array is comprised between 10 µm and 2 mm and preferably between 100 µm and 1 mm, with a height comprised between 0 and 200 µm.

In practice, there are used a line width of 400 µm and a height varying from 0 to 100 µm with a pitch, i.e. the minimum displacement of the engraving tool and a laser "spot" size (effectively active engraving area) which correspond to the resolutions of the engraving tools conventionally used for the intaglio engraving of plates.

These dimensions are of course calculated to allow obtaining a visual effect when the document is inclined, preferably by an angle on the order of +90° to −90°, and more preferably by an angle on the order of +30° to −30° which corresponds to the classic inclination of a banknote upon its inspection.

This security element is effective over a portion on the order of 2 cm$^2$, it being understood that the term "portion" means the recommended surface on which the system extends in order to be comfortably visible by a user.

This represents at least 50 adjacent engraved lines (for example on a 2 cm side) in a direction perpendicular to the main direction of extension of the array.

These dimensions also represent the engraving limits of the tool used to create the engraving. Indeed, when the engravings made are observed on a microscopic scale, they have a very disturbed surface condition. The flanks and the engraving backgrounds are not smooth and have asperities and blisters that are difficult to control. These defects are formed during the engraving steps, by partial melting of the laser-engraved material or by beads, milling residues.

Moreover, as mentioned above, the relatively large pitch of displacement of the engraving tool and the resolution, i.e. the size of the laser "spot"—on the order of 3 to 5 µm— (according to respective resolutions from 8,000 to 5,080 dpi) limit the formation of a smooth surface and promote the formation of contiguous facets rather discontinuous and separated from each other by rather protruding edges.

Finally, the dimensions of these structures are adapted to the medium on which they are applied, i.e. paper. The latter itself has a certain surface roughness which is on the same order of magnitude as that of the engraving which leads to a line loss of the quality of the optical effect sought between the creation of the structures on a software and the final result.

A need therefore arose to improve this security element, aiming in particular at miniaturizing it and maximizing the optical performances thereof. It is meant by "miniaturization" the visibility of the optical effect obtained with structures at least 10 times smaller (in width and in height/depth) than those of the state of the art described above.

This is particularly interesting when it is desired to use the security element on a security "thread" or "foil" and no longer on a printed part of the document. Indeed, in the case of security threads, when they are "window"-integrated in paper, the visibility portions of these threads are surfaces of about 2 to 5 mm, preferably 3 to 4 mm, width to 4 to 14 mm height in general, even if the tendency is for the maximum increase of these exhibition surfaces.

It is meant by "foils" a security element, cold or preferably hot transferred, directly on the surface of the paper, in the form of a patch or a stripe (extending over the entire height of the sheet/banknote).

A more recent variant exists where the patch or the stripe extends over a local opening formed in the medium.

Two main techniques can be envisaged: the hot transfer in which the carrier film is rewound after the thin film containing the security elements has been transferred on the medium, and the lamination where the carrier film of the security elements is directly deposited on the medium.

In all cases, if the surfaces delimited by a width and a length do not represent an issue for the case of a "foil", the thicknesses available for making the security element according to the state of the art known in FR-A-2942811 are reduced and do not exceed a few tens of microns.

Thus, if the engraving known from the aforementioned document is used directly on a surface of 0.15 cm$^2$ (case of the thread where the average window is of 3×5 mm), it would then be necessary to significantly reduce the number of engraved lines (more than 5 times less), and this at the expense of the visibility of the desired visual effect.

Another strategy would consist in using the same engraving, i.e. the one and the same engraved line of a width of 400 µm, but extended over a width of 4 mm. The drawback of this method is that the angle formed by the flank of the engraving becomes almost flat, namely less than 1° and not on the order of 30°, as it is the case when the width of the line is of 400 µm. Thereby, this loses the effect of changing reflection of light easily detectable with the naked eye on slopes that have become almost flat.

Moreover, the engraving depths taught in this same document vary from 0 to 200 µm and, in practice, are on the order of 0 to 100 µm.

These depths are incompatible with a security element in the form of a thread. Indeed, the thread is inserted into the paper at the time of its manufacture and must therefore be thin enough for its thickness not to exceed the thickness of the paper which is of about 100 µm.

As a result, the maximum possible thickness for a security thread, without posing a problem in particular of durability of the paper in which it is inserted, is on the order of 40 to 50 µm. And if the functional layers (varnish or protective layer, laminating glue, thermoadhesives, etc.) are removed from this thickness, a possible height on the order of a few microns to 30 µm remains for an engraved element. This engraving depth decrease contributes to flatten the angles if it were to be transposed to a security thread as it is.

The same reasoning applies mutatis mutandi for the foil in particular because of the aforementioned low thicknesses available which also force the angles to flatten.

The engraving technique as described in FR-A-2942811 is therefore not compatible with all the security elements, and in particular when they are in the form of a thread or a foil.

The present invention therefore aims in particular at providing a security element structure which is perfectly suited to miniaturization, without negative impact on the expected visual effect and even at improving the latter.

It also aims at proposing a method for manufacturing such an element whose flanks and engraving backgrounds as well as the associated crests are as smooth as possible, i.e. with a minimum of defects and asperities harmful to the deployment of the light reflection effects.

SUMMARY OF THE INVENTION

Thus, the present invention relates to a security element for a valuable document, which comprises an array (R) of at least two contiguous or adjacent lines, at least one of these lines being in relief and having two at least partly opposite inclined flanks which each originate along one of said longitudinal and opposite edges of said line, characterized in that said two opposite inclined flanks meet at a single and uninterrupted sinuous-shaped junction area which extends along the longitudinal direction of said line, said flanks having no discontinuity or interruption at least in said longitudinal direction.

This security element has a visual effect which results in a gradual and controlled change of the light reflection upon inclination of the medium, said light reflection remaining unchanged even when the size of this security element is particularly reduced.

According to other advantageous and non-limiting characteristics of this security element:

said junction area has the shape of a sinusoid;
said sinusoid has an unchanged period over its entire extent;
said sinusoid preferably has at least one period variation over its extent;
said array (R) has a non-periodic structure;
the relief of said at least two lines has a non-periodic variation in height, in width and/or in length;
said junction area is parallel or substantially parallel to the plane in which said two longitudinal and opposite edges are contained;
said junction area is perpendicular or substantially perpendicular to the plane in which said two longitudinal and opposite edges are contained;
the amplitude of said junction area is variable;
the spacing between said junction area and the plane in which said longitudinal edges are contained is constant or variable;
said junction area consists of a ridge or preferably a stripe;
at least one of said flanks has a rectilinear or non-rectilinear slope;
all the lines of said array have an identical width;
said at least two lines have a non-triangular relief profile; in width and/or in length;
at least one line of said array has a width different from that of the other lines;
at least one line of said array has a junction area of a different shape from that of the other lines;
said flanks are inclined upwards or downwards, relative to said longitudinal and opposite edges;
the assembly comprises a multilayer assembly and said array is integrated in this multilayer assembly, these additional layers being chosen from the group consisting of the dye or pigment inks, the color-changing pigment inks, the liquid crystals, the multilayer plastic films with refractive index variation, the optical interference filters with thin layers, the vacuum-deposited metals;
the security element is a security thread, a patch or a foil.

The obtained visual effect advantageously comprises at least one of the following effects:
contrast variation,
reflection,
interlacing of images, —gray-level image, in particular through light intensity variations,
movement and/or displacement of light objects,
images appearing in one or several plane(s) different from that/those of the thread.

The additional layers mentioned above allow adding other effects to the final structure. It is particularly an effect of change in color of the structure according to its viewing angle, this effect is in particular obtained by means of an additional layer chosen among the color-changing pigment inks, the liquid crystals, the multilayer plastic films with refractive index variation and the optical interference filters with thin layers.

Another aspect of the invention relates to a method for manufacturing a security element embossing tool according to any of the characteristics above.

This method is remarkable in that it comprises at least the steps consisting in:

a) making, i.e. manufacturing, a two-dimensional image characteristic of a fraction of a line of said array, this image having multiple levels of gray, a depth or an altitude being assigned to each gray level;

b) repeating step a) as much as necessary and assembling identical or different fractions to form a line of the desired shape and length;

c) repeating steps a) and b) as much as necessary to make lines to be assembled in a contiguous or adjacent manner in order to form sub-assemblies;

d) if necessary, repeating steps from a) to c) so as to achieve the final pattern;

e) from the image or the final pattern derived from steps a) to d) above, forming a three-dimensional image in which each point of this image has a location characteristic of said gray level;

f) proceeding with the three-dimensional hardware production thereof, so as to obtain an imprint characteristic of the image derived from step e).

According to a particular embodiment, said origination is carried out by implementing either of the following techniques: photolithography, in particular gray-level photolithography, laser lithography, electronic lithography or electron-beam lithography.

Finally, the invention relates to a valuable document, in particular a banknote, which includes at least one security element according to any of the preceding characteristics.

BRIEF DESCRIPTION OF THE DRAWINGS

Other characteristics and advantages of the invention will become apparent upon reading the following description of preferred embodiments of the invention. This description is made with reference to the appended drawings in which:

FIG. 4 is a top view of part of a line of an array according to one variant of the invention, while FIGS. 4A and 4B are sectional views of FIG. 4, according to planes the IVA and IVB;

FIGS. 5 to 10 are schematic views intended to illustrate some specific shapes of inclined flanks of elements according to the invention;

FIG. 11 is a top view of part of a line of an array according to one variant of the invention, while

FIG. 12 is a top view of part of a line of an array according to one variant of the invention, while

FIG. 13 is a top view of part of a line of an array according to one variant of the invention, while

FIG. 14 is a top view of part of a line of an array according to one variant of the invention, while

FIG. 15 is a top view of part of a line of an array according to one variant of the invention, while

FIG. 16 is a top view of part of a line of an array according to one variant of the invention, while FIGS. 16A, 16B and 16C are sectional views of FIG. 16, respectively according to the planes XVIA, XVIB and XVIC;

FIG. 17 is a top view of part of a line of an array according to one variant of the invention, while FIGS. 17A, 17B and 17C are sectional views of FIG. 17, respectively according to the planes XVIIA, XVIIB and XVIIC;

FIG. 18 is a top view of part of a line of an array according to one variant of the invention, while FIGS. 18A and 18B are sectional views of FIG. 18, respectively according to the planes XVIIIA and XVIIIB;

FIG. 19 is a top view of part of a line of an array according to one variant of the invention, while FIGS. 19A to 19E are sectional views of FIG. 19, respectively according to the planes XIXA to XIXE;

FIG. 20 is a top view of part of a line of an array according to one variant of the invention, while FIGS. 20A, 20B and 20C are sectional views of FIG. 20, respectively according to the planes XXA, XXB and XXC;

FIG. 21 is a top view of part of a line of an array according to one variant of the invention, while FIGS. 21A and 21B are sectional views of FIG. 21, respectively according to the planes XXIA and XXIB;

FIG. 22 is a top view of part of a line of an array according to one variant of the invention, while FIGS. 22A and 22B are sectional views of FIG. 22, respectively according to the planes XXIIA and XXIIB;

FIG. 23 is a top view of part of a line of an array according to one variant of the invention, while FIGS. 23A and 23B are sectional views of FIG. 23, respectively according to the planes XXIIIA and XXIIIB;

FIG. 24 is a top view of part of a line of an array according to one variant of the invention, while FIGS. 24A and 24B are sectional views of FIG. 24, respectively according to the planes XXIVA and XXIVB;

FIG. 25 is a top view of part of a line of an array according to one variant of the invention, while FIGS. 25A and 25B are sectional views of FIG. 25, respectively according to the planes XXVA and XXVB;

FIG. 26 is a top view of part of a line of an array according to one variant of the invention, while FIGS. 26A, 26B and 26C are sectional views of FIG. 26, respectively according to the planes XXVIA, XXVIB and XXVIC;

FIG. 27 is a top view of part of a line of an array according to one variant of the invention, while FIGS. 27A, 27B and 27C are sectional views of FIG. 27, respectively according to the planes XXVIIA, XXVIIB and XXVIIC;

FIG. 28 is a top view of part of a line of an array according to one variant of the invention, while FIGS. 28A, 28B and 28C are sectional views of FIG. 28, respectively according to the planes XXVIIIA, XXVIIIB and XXVIIIC;

FIG. 29 is a top view of part of a line of an array according to one variant of the invention, while FIGS. 29A to 29E are sectional views of FIG. 29, respectively according to the planes XXIXA to XXIXE;

FIG. 30 is a top view of part of a line of an array according to one variant of the invention, while FIGS. 30A, 30B and 30C are sectional views of FIG. 30, respectively according to the planes XXXA, XXXB and XXXC;

FIG. 31 is a top view of part of a line of an array according to one variant of the invention, while FIGS. 31A, 31B and 31C are sectional views of FIG. 31, respectively according to the planes XXXIA, XXXIB and XXXIC;

FIGS. 32 to 36 are schematic sectional views of multi-layer security elements according to the invention;

Finally.

DETAILED DESCRIPTION OF THE INVENTION

Figure 1:
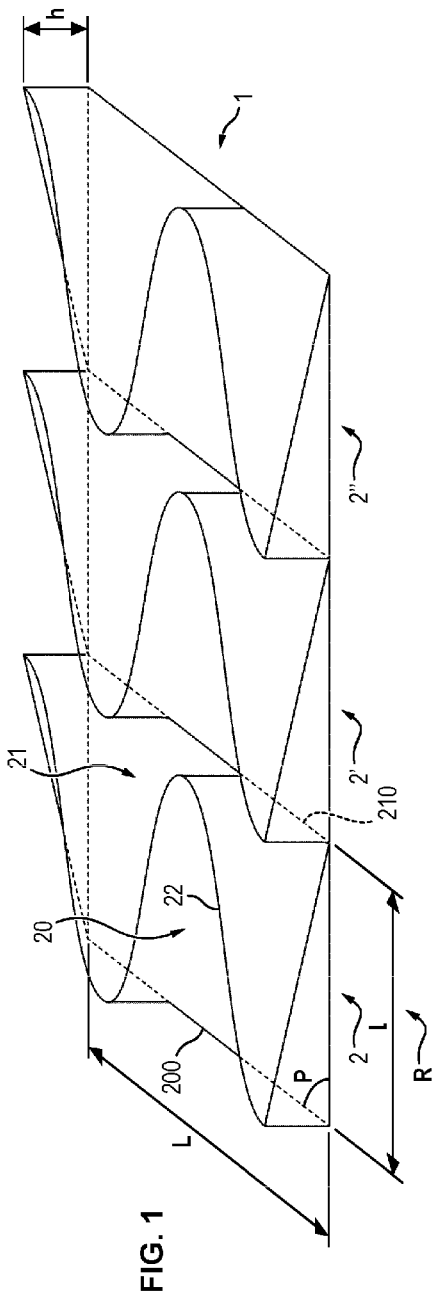
FIG. 1 is a schematic, three-dimensional and partial view of an array of lines of a security element according to the invention.

FIG. 1 represents a security element according to the invention.

This element is only very partially represented so as to make consultation of the figure easier.

Thus, this element 1 is formed on a plastic material such as polyethyleneterephthalate (PET) or bi-oriented polypropylene (BOPP), without limitation.

In the example represented here, the element 1 includes an array R formed of three contiguous lines 2, 2' and 2". Of course, it is possible to provide for an element having a much greater number of lines. The length L of the lines is, in this particular case, identical and may be on the order of a few millimeters to a few centimeters. Only a portion is represented here. Likewise, the width 1 of each of the lines is identical in this particular case and is comprised between a lower limit which will diffract the incident light (in the vicinity of 1 µm, which is to be avoided) and 100 µm to be restricted to a phenomenon of pure reflection, preferably the upper limit is less than 50 µm and even more preferably less than 40 µm.

The height h is, for its part, comprised for example between 1 and 50 µm and preferably on the order of 10 µm or less.

Of course, in one embodiment not represented, lines of different widths 1 could be provided.

In the represented example, the lines 2 to 2" are rectilinear. However, in one variant not illustrated in the figures, the array R can comprise lines having curved, circular and more generally any shape or even a single, for example spiral-shaped, line so that the array R is formed by the plurality of turns of the spiral.

As clearly visible in the figure, each of the three lines of the array R is in relief. However, it is possible to envisage that part of them is in relief while the remaining lines are strictly planar. Thus, for example, it is possible to envisage an alternation of relief lines and planar lines. The presence of non-reflective, in particular transparent, lines could be used to reveal visually discernible elements of information.

In the example represented and in accordance with the invention, each of the relief lines 2 to 2" has two opposite inclined flanks 20 and 21 which each originate along one of the longitudinal and opposite edges 200 and 210 of the line. Here, the flanks are inclined upwards, which means that they extend towards each other to a higher altitude than that of the longitudinal edges 200 and 210.

It is meant throughout the present application by the expression "inclined flanks" that at least part of at least one of these two flanks is inclined. In other words, this does not exclude that the flanks are locally vertical or horizontal.

Still according to the invention, the two flanks 20 and 21 meet at a single and uninterrupted sinuous-shaped junction area 22 which extends along the longitudinal direction of the line, these flanks 20 and 21 having no discontinuity or interruption, at least in the longitudinal direction.

It is meant by the expression "sinuous-shaped junction area" that this sinuous junction area does not include any angular area. In other words, the projection of the junction area in the plane of the array and the projection of the junction area in the plane orthogonal to the array and parallel to the lines, are each described by a continuous function differentiable at any point. In addition, this junction area is uninterrupted so that it extends in a unique way from one end to the other of the line in question.

In the particular embodiment of FIG. 1, the junction area 22 has the shape of a sinusoid and is limited to a line forming a ridge. In other embodiments, some of which will be described below, this junction area could consist not of a ridge but of a stripe of constant or variable width.

Moreover, this junction area could have a shape different from that of a sinusoid while remaining sinuous.

Here, the sinusoid has an unchanged period over its entire extent. In addition, the adjacent lines are in phase (parallel evolution of the junction areas), but it could of course be otherwise. Moreover, its amplitude is equal to the width 1 of the line. Here again, it could be otherwise. Particularly, the sinusoid may have a variable period, the adjacent lines may have a phase shift, and/or the amplitude of the sinusoid is different from the width of the lines.

Finally, it is noted that the plane in which this sinusoid extends is parallel to the plane P which contains the two longitudinal edges 200 and 210. Again, it could be otherwise, as will be shown with reference to other figures.

Furthermore, it is noted that the flanks 20 and 21 of each line have a rectilinear slope from one of the longitudinal edges towards the junction area 22.

Figure 2:
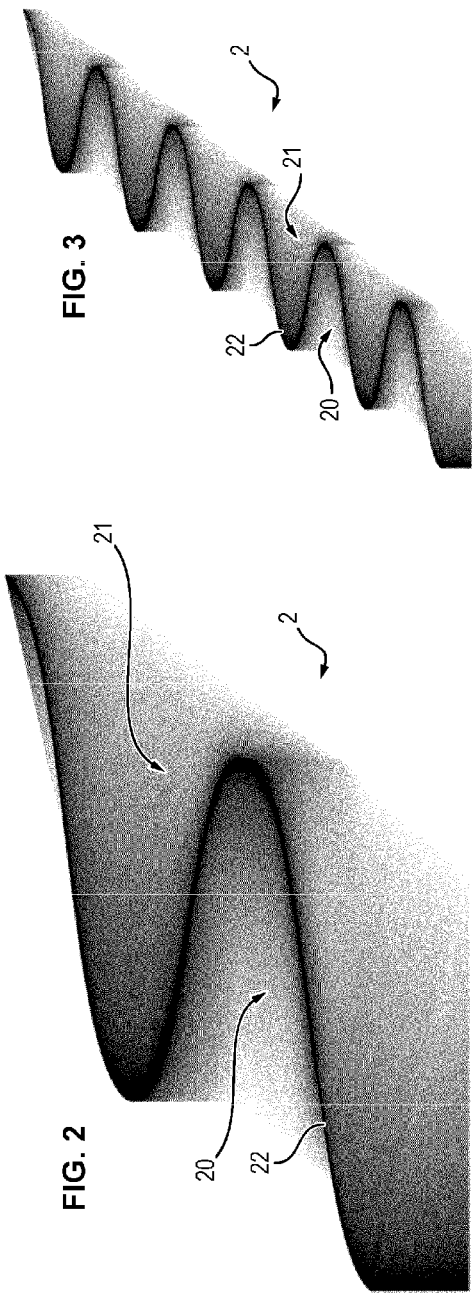
FIG. 2 is a view of part of a line of FIG. 1, represented in "gray levels"

FIG. 2 represents only one of the lines of the array R of FIG. 1. Furthermore, this line is represented in "gray levels". This means that a shade comprised between white and black has been assigned to each point of this line by taking into account the rule according to which the more the point of this line is distant from the aforementioned plane P, the darker its color. Thus, the area 22 is represented in black color. This representation in gray levels is used for the manufacture of the present security element, as will be shown later in the description.

Figure 3:
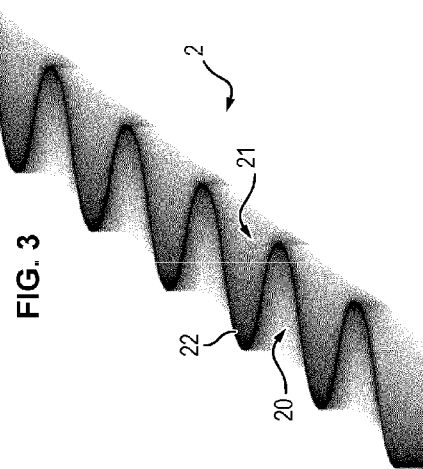
FIG. 3 is a view of a more extended line of the array of FIG. 1, represented in "gray levels"

FIG. 3 is a view equivalent to FIG. 2, except that a line 2 having a greater longitudinal extent has been represented.

FIG. 4 represents a top view of the line of FIGS. 2 and 3, and limited to the representation of a single period of the sinusoid. It is even easier to distinguish the different variations of gray, depending on the considered location. The section of FIG. 4A explicitly shows that, in this region, the junction area 22 is located at the vertical of the longitudinal edge 200. This figure also shows that the flank 21 has a rectilinear slope.

FIG. 4B illustrates, for its part, the fact that, according to the cutting plane illustrated here, the junction area 22 is located halfway between the two longitudinal edges 200 and 210. The straight line which is located at the vertical of the area 22 is referenced 23, however without this straight line existing in reality.

FIG. 5 is similar to FIG. 4A and emphasizes the fact that the flank 21 has a rectilinear slope. In this figure et seq., the reference h designates the maximum height of the sinusoid 22.

FIGS. 6 to 10 represent general shapes (sections) different from the flank 21, without this constituting an exhaustive panel. However, it should be specified that these descriptions are also valid for the second flank 20 which has not been represented here. Of course, the flanks 20 and 21 can have different general shapes.

Thus, in FIG. 6, the flank 21 has a slope which is slightly convex, whose convexity is directed away from the base of the flank.

Conversely, FIG. 7 deals with a flank 21 whose slope has a slight concavity directed towards the base of the flank.

FIGS. 8 to 10 represent embodiments based on those that have just been described.

Thus, more specifically, FIG. 8 represents the situation in which the flank 21 falls within a straight line but has locally a slight concavity (trough) referenced 24 as well as a slight convexity (boss) referenced 25.

FIG. 9 illustrates a flank 21 which is generally convex but which has a point of inflection, i.e. a change in curvature, towards the edge 210.

As for FIG. 10, it deals here with a flank 21 of a shape generally similar to that of FIG. 9 but with, locally, a slight concavity (trough) referenced 24 as well as a slight convexity (boss) 25.

These bosses or "growths" and troughs or "hollows" generate, within the element, specific reflective aspects of light, in order to reveal information that stands out from the background according to the viewing angle.

Figure 11:
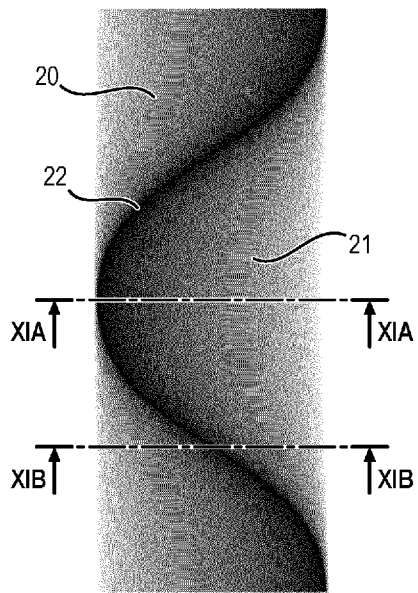
Figure 11A:
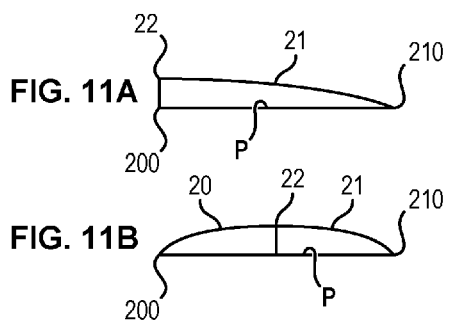
FIGS. 11A and 11B are sectional views of FIG. 11, respectively according to the planes XIA and XIB.
Figure 11B:

FIG. 11 is a view similar to FIG. 4 of one variant. Here again, it deals with a junction area 22 which has the shape of a sinusoid whose amplitude is equal to the width 1 of the line. However, it will be noted on observation of FIGS. 11A and 11B that the two flanks 20 and 21 have a convex-shaped slope.

Figure 12:
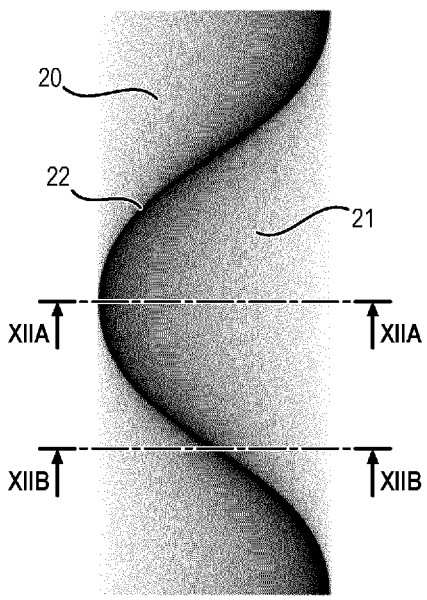
Figure 12A:
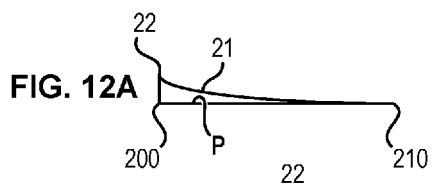
FIGS. 12A and 12B are sectional views of FIG. 12, respectively according to the planes XIIA and XIIB.
Figure 12B:
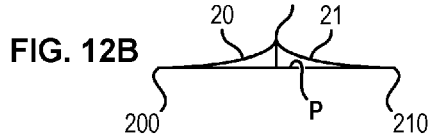

FIG. 12 deals with one variant of FIG. 11 in which, as shown in FIGS. 12A and 12B, the flanks 20 and 21 have a concave-shaped slope.

Figure 13:
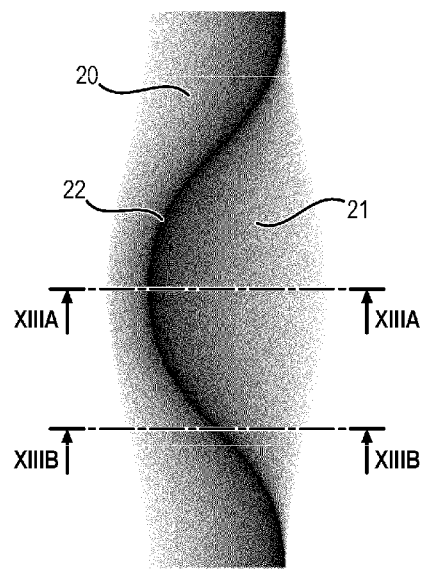
Figure 13A:
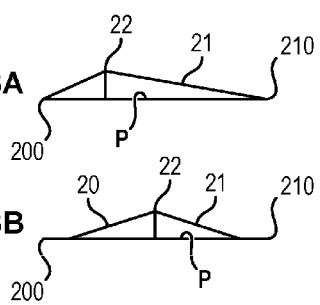
FIGS. 13A and 13B are sectional views of FIG. 13, respectively according to the planes XIIIA and XIIIB.
Figure 13B:
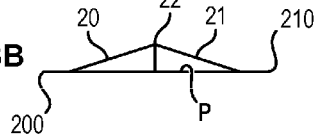

The embodiment of FIG. 13 still deals with a junction area which has the shape of a sinusoid. However, here its amplitude is smaller than the width 1 of the line. In addition, its flanks 20 and 21 have a slope comprising one or two rectilinear portions, as shown in FIG. 13B. Indeed, in some areas of this line, each flank 20 and 21 has a part of attachment to the edges 200 and 210 which is coincident with the aforementioned plane P.

The embodiments which have just been described had in common that the junction area 22 is parallel to the plane P in which the longitudinal edges 200 and 210 are contained.

Figure 14:
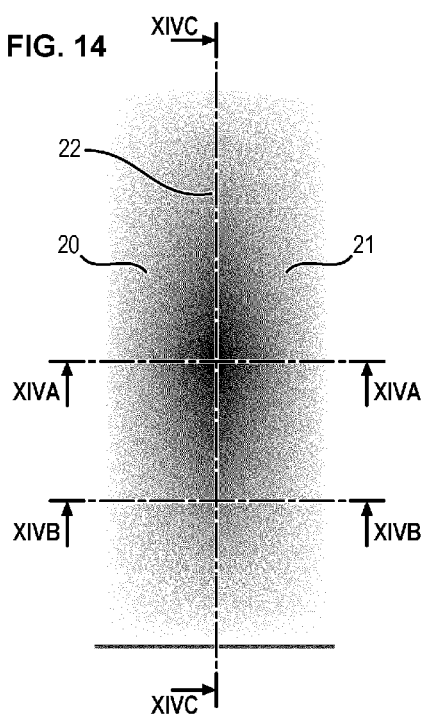

This is not the case with FIG. 14 in particular. Indeed, in this embodiment, if the junction area 22 still falls within a sinusoid, the latter is deployed in a plane perpendicular or substantially perpendicular to the aforementioned plane P.

Figure 14A:
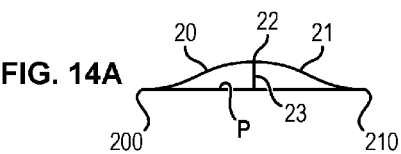
FIGS. 14A, 14B and 14C are sectional views of FIG. 14, respectively according to the planes XIVA, XIVB and XIVC.
Figure 14B:
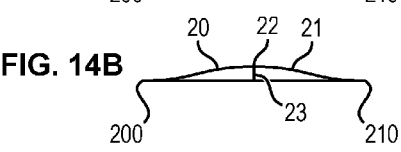
Figure 14C:
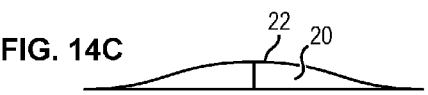

The consultation of FIGS. 14A to 14C shows that the flanks 20 and 21 meet the opposite edges 200 and 210, these flanks having a slope of curved shape with a point of inflection.

Figure 15:
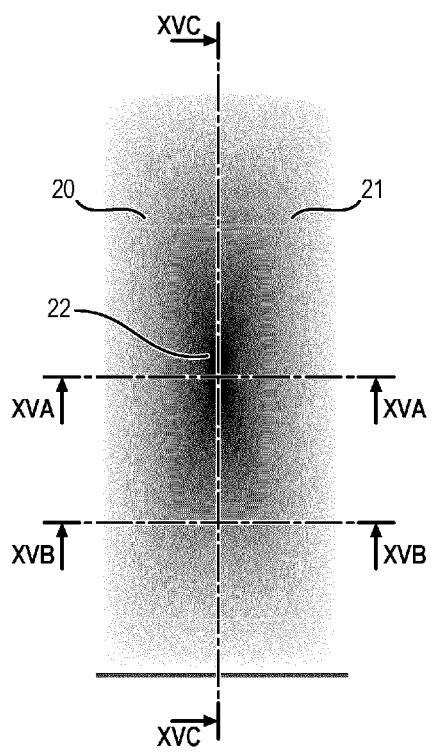
Figure 15A:
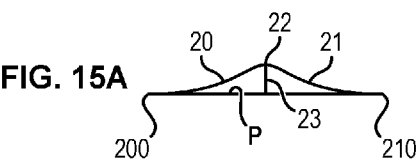
FIGS. 15A, 15B and 15C are sectional views of FIG. 15, respectively according to the planes XVA, XVB and XVC.
Figure 15B:
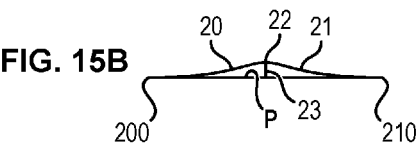
Figure 15C:
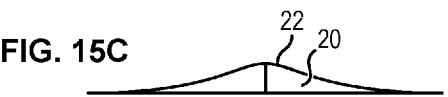

The embodiment of FIG. 15 substantially deals with the same characteristics as in the variant of FIG. 14. However, the amplitude of the sinusoid is slightly smaller and the flanks 20 and 21 have a slightly concave shape.

Likewise, the variant of FIGS. 16, 16A, 16B and 16C substantially deals with the embodiments of FIG. 14 et seq. except that the maximum altitude of the junction area 22 remains stable over a certain extent, so that it gives it the form of a plateau.

In the embodiments which have just been described, the junction area 22 was always overhanging relative to the locations from where the flanks 20 and 21 originate.

This is not the situation illustrated in FIG. 17 in which the junction area 22 is still located at a level lower than that of the flanks 20 and 21. This area has the shape of a sinusoid whose amplitude is smaller than the width of the line. In addition, its "altitude", i.e. its distance with respect to the plane P is not constant, as shown in FIGS. 17A and 17B.

FIG. 18 represents a situation relatively similar to that of FIG. 17. Again, the amplitude of the junction area 22 is smaller than the width 1 of the line, and the flank 21 has here, locally, a level difference located in the form of a trough and referenced 24.

FIG. 19 schematically represents the situation in which the junction area still has the shape of a sinusoid. However, it is not deployed in a plane strictly parallel to the plane P in which the longitudinal edges 200 and 210 are contained. More specifically, as one advances in the longitudinal extent of this line, said junction area approaches the aforementioned plane P.

Figure 20:
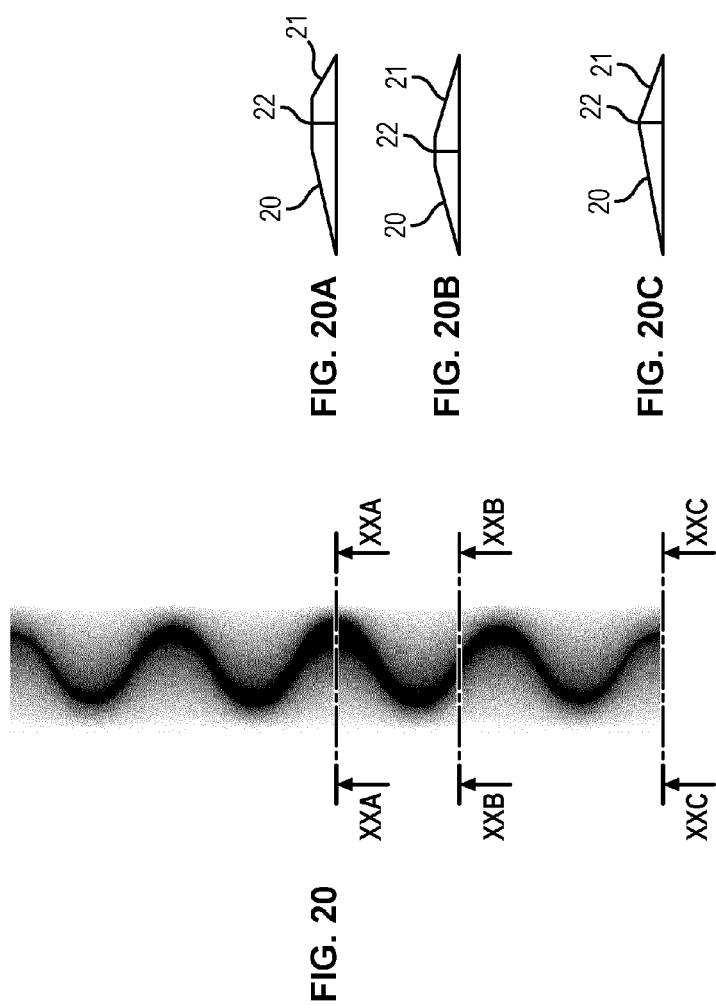

The embodiment of FIG. 20 deals with a junction area which still falls within a sinusoid. However, this junction area has the shape of a stripe, i.e. it is not materialized by a ridge but has a non-negligible transverse extent, as shown in particular in FIG. 20A.

FIG. 21 illustrates a situation comparable to that of FIG. 4. However, it will be noted that the sinusoidal junction area 22 has an amplitude which is still smaller than the width of the line and is centered on this line so that the flanks 20 and 21 are each bordered towards the longitudinal edges 200 and 210 by strictly planar areas coincident with the aforementioned plane P.

FIG. 22 deals with a junction area 22 which is still recessed relative to the flanks 20 and 21, as shown particularly in FIGS. 22A and 22B. On the other hand, the amplitude of this junction area is still equal to the width of the line.

This is not the case with FIG. 23 where the sinusoidal junction area 22 has an amplitude smaller than the width of the line. In addition, here again, this junction area is recessed relative to the flanks 20 and 21.

FIG. 24 deals with a sinusoidal junction area 22 whose amplitude is smaller than the width of the line. Moreover and as shown in the two sectional views of FIGS. 24A and 24B, the flanks 20 and 21 locally have either a horizontal orientation (in the form of a plateau) or the combination of a horizontal and oblique (inclined) orientation.

FIG. 25 represents a shape of a sinusoidal junction area 22 relatively similar to that of FIG. 23. However, as can be observed from the reading of FIG. 25B, in some regions of the longitudinal extent of the line, the flanks 20 and 21 each comprise two rectilinear portions of different orientation.

FIG. 26 represents one embodiment which is exactly the inverse of that of FIG. 14. This means that the sinusoidal junction area 22 is deployed in a plane parallel to the planes that contain the edges 200 and 210. However, the flanks 20 and 21 are still raised relative to said junction area.

FIG. 27 represents a situation relatively similar to that of FIG. 26, except that the period and the amplitude of the sinusoid which constitutes the junction area 22 are different.

FIG. 28 represents an embodiment very similar to that of FIG. 27. It is distinguished by the fact that the flanks 20 and 21, instead of being convex, are concave.

FIG. 29 is composed of a unit module mirrored horizontally and vertically. This base module has four corners. An altitude has been set at each corner of this base module. The opposite corners are at the same altitude. Two are at maximum altitude and two are at minimum altitude. This module therefore looks like an "X" whose two opposite tips go up and the two others go down.

FIG. 30 illustrates the case where the sinusoid is not centered in the block. The junction area 22 has a continuous but irregular shape. The flanks 20 and 21 have a variable amplitude depending on their position on the block. Thus, in the sectional view represented in FIG. 30A, the flanks 20 and 21 consist of plateaus and perfectly symmetrical increases/decreases, whereas in the sectional view represented in FIG. 30B, the plateaus and slopes of the flanks 20 and 21 are not symmetrical, thus generating a more or less narrow valley effect.

Finally, the embodiment of FIG. 31 still deals with a sinusoidal junction area. It extends in a plane parallel to the aforementioned plane P but it is noted, in particular by comparing FIGS. 31 and 31C, that the period of this sinusoid varies according to the longitudinal extent of the line.

After having described these different embodiments of the security element 1 according to the invention, let us now proceed to the description of at least one example of manufacture of an imprint of such a security element.

For this description, reference will be made more specifically to FIGS. 1, 2, 3 and 4.

Thus, in a first step, this method consists in making, i.e. in manufacturing, a two-dimensional image which is characteristic of a fraction of a line of the array R to be constituted, this image having "multiple levels of gray", a depth or an altitude being assigned to each gray level.

Preferably, this first step makes use of vector or raster graphical tools, such as currently available software. A two-dimensional image is thus obtained where the unit segment is here the period characteristic of the sinusoid. This unit segment will be replicated in a manner similar to what is visible in the abovementioned FIGS. 3 and 4 or adjoined to a new segment so that the effect obtained is visually continuous and devoid of visible connection point. At least two identical or different unit segments form a first block or a first fraction to be replicated as many times as desired.

In a second step, the step which has just been described is repeated as many times as necessary and different unit segments and/or identical or different blocks or fractions are assembled to form a line of the desired shape and length. Of course, in order to maintain the continuity of the design, it is made sure that the starting and ending points of the junction area of each of the blocks connect to each other without a visible connection point.

This applies, of course, even if the junction area extends in a plane perpendicular to the aforementioned plane P.

In a subsequent step, the previous steps are repeated as many times as necessary to make several lines to be assembled in a contiguous or adjacent manner in order to constitute sub-assemblies able to generate optical effects discernible with the naked eye. The lines of the array R of a sub-assembly could be identical or different. Finally, the whole is repeated again so as to achieve, if this is the objective that has been set out, the final pattern with these sub-assemblies. It is noted that it is meant here by "sub-assembly" a three-dimensional structure whose optical effects are sufficient in themselves in that they are remarkable and in that the assembly of identical or different sub-assemblies can be made with discontinuity in the connections (non-continuity of the lines, sudden change of inflection or even total disconnection but small enough to be indiscernible to the naked eye). According to a preferred variant, said assembly of identical or different sub-assemblies is made with continuity in the connections.

In a subsequent step, and based on what has just been described, a three-dimensional image in which each point of this image has a location characteristic of the gray level is made, still with vector graphical tools. This image is then encoded in the specific language of the tool generating the actual engraving elements in order to be recorded therein in the form of an imprint in an engravable medium.

By way of example and without limitation, each line obtained has the configuration of FIG. 3.

A following step of this method consists in implementing the origination of a photosensitive resin by three-dimensional engraving thereof, with a view to obtaining an engraving characteristic of the image derived from the previous step.

This origination can be implemented in particular by the following techniques:

a) the photolithography or optical projection-lithography:

This involves exposing a photosensitive resin to photons through a mask. In the exposed areas, the photons modify the solubility of the resin. If the resin is positive, the exposed area is removed during the development while, if it is negative, the exposed area is maintained during this development;

b) the gray-level photolithography:

In this particular case, the mask is a gray-level mask, therefore the densities of opaque pixels are on a transparent background, the more or less exposed parts making it possible to manage different step heights;

c) the laser-lithography

This technique is interesting since there is no use of a mask. Lasers, such as UV, nanosecond pulsed, excimer, NdYAG, picosecond or femtosecond lasers, are used in direct use on the resin.

The resolution is on the order of 0.8 µm.

d) the electronic lithography or electron beam (e-beam) lithography:

This involves is a maskless technique in which the patterns are created by direct scanning of an electron beam (10 to 100 electronvolts) in the resin film. The resolution is equal to the diameter of the electron beam, which represents a few nanometers. The engraving depth is given by the penetration of the electrons, which is of 100 nm.

What these technologies have in common is that they allow obtaining almost smooth and planar engravings. In other words, given the very small pitch of the tool (from a few nanometers to 0.8 µm), the engraving background but also the engraving flank can be almost devoid of asperities, at least compared to the aforementioned state of the art.

However, if surface irregularities were still present damaging the production and legibility of the desired optical effects, it would be possible to envisage a micropolishing. A single mirror which extends along an engraving direction and which is curved in the shape of a flank whose angles vary continuously is then obtained in each line.

The subsequent steps of manufacturing the embossing elements (such as plates) are relatively conventional and require the transformation (electrodeposition, recombination, chromium plating, etc.) of the unitary element created during the origination step up to the multiple-up tool which will be used for a thermoplastic embossing or for a UV-assisted embossing by the technique called "Nano Imprint" lithography.

In the foregoing, there is just a description of a single-layer security element. However, in a good number of situations, this security element will be a multilayer security element and it is proposed to describe some embodiments thereof, most particularly with reference to FIGS. 32 to 36.

Thus, the embodiment of FIG. 32 deals with an assembly E which has a security element 1 according to the invention consisting of a plastic film 3 covered by an embossable varnish 4. Thin chromium 5, silica oxide 6 and aluminum 7 layers are successively deposited on this security element and this by way of illustration only. Of course, other thin film stacks with other materials and/or a different number of layers can be envisaged to produce remarkable visual effects. The localized removal of part of the aluminum 7 is then carried out to create openings 70.

According to this variant, the observer who looks at this assembly through the film 3 will notice the combination of several optical effects. Thus, the layers 5, 6 and 7 cause effects of change in color of the structure according to its viewing angle, for example from magenta to green. This color change effect is associated with the progressive variations of the angle of the curved mirror consisting of the security element 1, which causes a synergy effect in which the hollow of the engravings is tinted with a uniform color, while the flanks gradually change color to a green tint. It is noted here that the security element 1 is represented rotated at 90° from reality to be in order to be located in the plane of the figure, for the purpose of good understanding.

The embodiment of FIG. 33 deals successively, from top to bottom, with a plastic film 3, an embossable varnish 4, an aluminum layer 7 having openings 70, a silicon oxide layer 6 and a chromium layer 5. The security element 1 is made on this assembly of superimposed layers.

Figure 34:
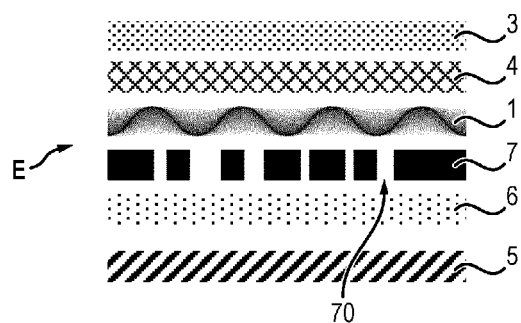

Yet another assembly E is represented in FIG. 34, the viewing side being that of the thin chromium layer 5.

Figure 35:
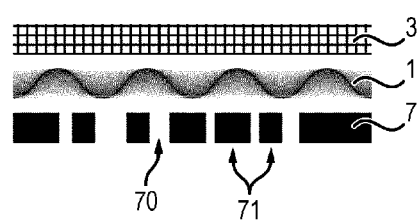

The embodiment of FIG. 35 deals with a medium 3 which includes therein or on its surface a color change effect. This comprises a multilayer material with refractive index variation or at least one liquid crystal ink. This medium is coated with a varnish 1 which is deformed during its application by micro replication in the UV-assisted wet state (or Nano Imprint), so that the shape of the engraved tool reproduces its imprint in the varnish. The varnish is then covered with a colored, for example black, layer 7 so as to reveal, during an observation through the medium and in line with the printed areas 71, a combined effect of color change and curved mirror. In the openings 70 corresponding to areas not coated with black ink, a clear and transparent text effect is achieved.

Figure 36:
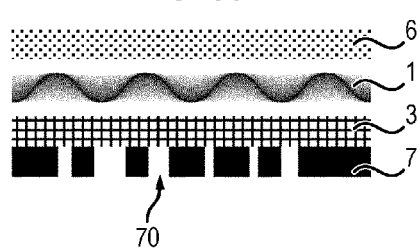

In the embodiment of FIG. 36, the varnish medium 3 is interposed between the security element 1 and the layer 7. In addition, an additional layer 6 whose refractive index is sufficiently different from that of the varnish of the varnish medium 3 is provided rearwardly of the element 1. This layer is preferably chosen among varnishes with high refractive index, for example of the ZnS type, or with low refractive index, of the perfluoropolyether type.

Of course, additional layers used for the manufacture of security elements such as threads, like the camouflage layers, laminating layers with another plastic medium or thermoadhesive layers, protective layers, adhesive layers, have not been represented in the figures which have just been described, for the sake of simplification.

Figure 37:
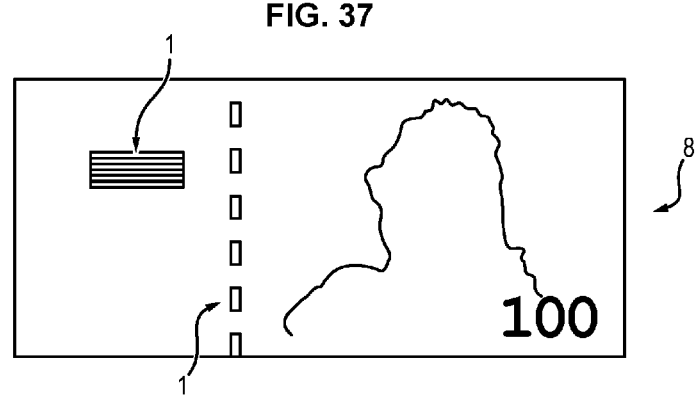
FIG. 37 is a top view of a banknote which integrates two security elements according to the invention.

FIG. 37 deals with a banknote which has two security elements according to the invention, namely in the left part a security element 1 which has the shape of a rectangular block (a patch), and to the right an element 1 in the form of a windowed security thread.

Figure 38:
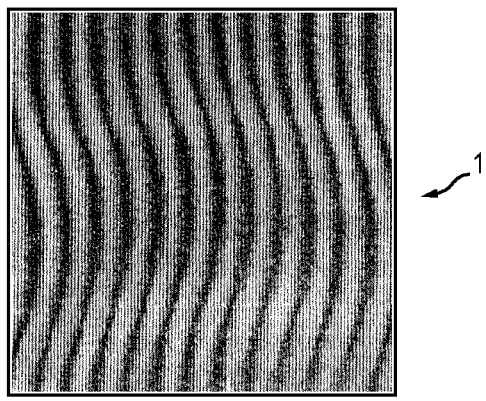
FIGS. 38 to 40 are illustrations of three embodiments of elements according to the invention.

FIG. 38 shows an example of a security element 1 according to the teachings of the present invention, which represents a square-shaped pattern consisting of a series of sub-assemblies of ten lines whose sinusoids are in phase relative to each other to form the array R. Each of these sub-assemblies is shifted vertically relative to its left and right neighbors. This shift is regular until the middle of the image where it is inverted. This results in a macroscopic effect of herringbones capable of moving according to the inclination of the medium on which the element 1 is introduced/affixed.

Figure 39:
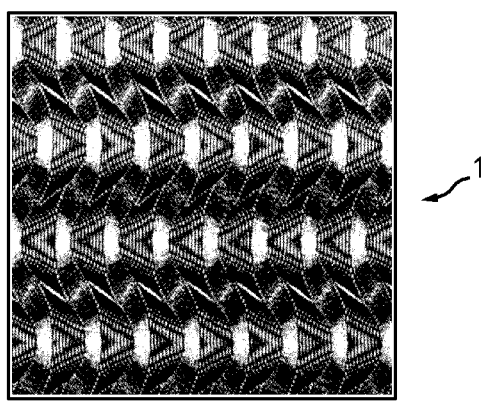

FIG. 39 shows a second example of a security element 1 according to the teachings of the present invention, which represents a square-shaped pattern consisting of a series of sub-assemblies forming waves stylized in the manner of "The Great Wave off Kanagawa" from Hokusai.

In this particular case, a wave consists of two sub-assemblies. The first sub-assembly consists of curved lines whose interior widens through a maximum. A second sub-assembly is adjoined thereto and its lines are curved in the same direction as the first one, but the interior narrows through a minimum. This pair of adjoined sub-assemblies is repeated and ordered in a tiling which allows not leaving a gap therebetween. This results in a macroscopic effect of waves capable of moving according to the inclination of the medium on which the element 1 is introduced/affixed.

Figure 40:
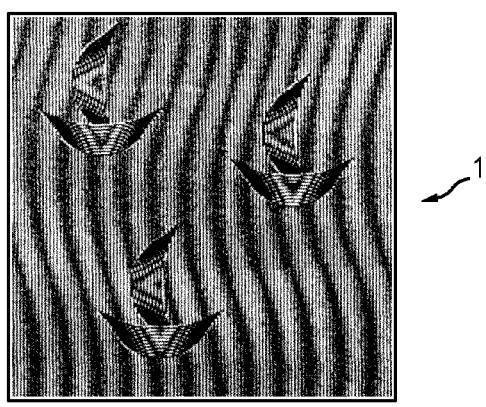

Finally, FIG. 40 shows a third example of a security element 1 in accordance with the teachings of the present invention, which represents a square-shaped pattern consisting of a series of sub-assemblies forming patterns of stylized boats sailing on an expanse of water. The expanse of water is built in the manner of FIG. 38 and the boats are built in the manner of FIG. 39, in particular with a first sub-assembly consisting of curved lines whose interior widens through a maximum forming the hull and, identically, another sub-assembly reproducing the sail. All these sub-assemblies are superimposed to form the overall image represented in FIG. 40.

These last three figures show a slight overview of the possibilities of creation. The possibilities of arrangement of these sub-assemblies are virtually endless, so that it is possible to make any type of more or less figurative, more or less stylized image.

The invention claimed is:

1. A security element for a valuable document, which comprises an array of at least two contiguous or adjacent lines, each of said lines comprising longitudinal and opposite edges, at least one of these contiguous or adjacent lines being in relief and having two opposite flanks, at least one of which is partly inclined, wherein each of said opposite flanks originate along one of said longitudinal and opposite edges of said line, and wherein said two opposite flanks meet at a single and uninterrupted sinuous-shaped junction area which extends along the longitudinal direction of said line, said opposite flanks having no discontinuity or interruption at least in said longitudinal direction, and wherein a projection of said junction area in the plane of said array and a projection of said junction area in a plane orthogonal to said array and parallel to said lines are each described by a continuous function differentiable at any point.

2. The element according to claim 1, wherein said junction area has the shape of a sinusoid.

3. The element according to claim 2, wherein said sinusoid has an unchanged period over its entire extent.

4. The element according to claim 2, wherein said sinusoid has at least one period variation over its extent.

5. The element according to claim 1, wherein said array has a non-periodic structure.

6. The element according to claim 1, wherein the relief of said at least two lines has a non-periodic variation over its extent.

7. The element according to claim 1, wherein said junction area is parallel or substantially parallel to the plane in which said two longitudinal and opposite edges are contained.

8. The element according to claim 7, wherein that the amplitude of said junction area is variable.

9. The element according to claim 1, wherein said junction area is perpendicular or substantially perpendicular to the plane in which said two longitudinal and opposite edges are contained.

10. The element according to claim 1, wherein the spacing between said junction area and the plane in which said longitudinal edges are contained is constant or variable.

11. The element according to claim 1, wherein said junction area consists of a ridge or a stripe.

12. The element according to claim 1, wherein at least one of said flanks has a rectilinear or non-rectilinear slope.

13. The element according to claim 1, wherein all said lines of said array have an identical width.

14. The element according to claim 1, wherein at least two lines of said array have a non-triangular relief profile in width and/or in length.

15. The element according to claim 1, wherein at least one line of said array has a width different from that of the other lines.

16. The element according to claim 1, wherein at least one line of said array has a junction area of a different shape from that of the other lines.

17. The element according to claim 1, wherein said flanks are inclined upwards or downwards, relative to said longitudinal and opposite edges.

18. The element according to claim 1, wherein said element comprises a multilayer assembly, wherein said array is integrated in said multilayer assembly, and wherein said multilayer assembly comprises additional layers which are chosen from the group consisting of the dye or pigment inks, the color-changing pigment inks, the liquid crystals, the multilayer plastic films with refractive index variation, the optical interference filters with thin layers, the vacuum-deposited metals.

19. A valuable document, which includes at least one security element according to claim 1.

20. A valuable document according to claim 19, which consists of a banknote.

* * * * *